United States Patent [19]

Heidenreich et al.

[11] Patent Number: 4,770,809

[45] Date of Patent: Sep. 13, 1988

[54] AZO DYESTUFFS AND LIQUID CRYSTAL MATERIAL CONTAINING AZO DYESTUFFS

[75] Inventors: Holger Heidenreich, Cologne; Uwe Claussen, Leverkusen, both of Fed. Rep. of Germany

[73] Assignee: Bayer Aktiengesellschaft, Leverkusen, Fed. Rep. of Germany

[21] Appl. No.: 915,304

[22] Filed: Oct. 3, 1986

[30] Foreign Application Priority Data

Oct. 11, 1985 [DE] Fed. Rep. of Germany ....... 3536267

[51] Int. Cl.$^4$ .......................... G02F 1/13; C09K 19/00
[52] U.S. Cl. .................... 252/299.1; 350/349; 534/577
[58] Field of Search ...................... 350/349; 252/299.1; 534/577

[56] References Cited

U.S. PATENT DOCUMENTS

| | | | |
|---|---|---|---|
| 4,426,312 | 1/1984 | Claussen | 252/299.1 |
| 4,483,914 | 11/1984 | Naito et al. | 252/299.1 |
| 4,519,935 | 5/1985 | Claussen | 252/299.1 |
| 4,600,527 | 7/1986 | Imazeki et al. | 252/299.1 |
| 4,606,991 | 8/1986 | Kawata et al. | 252/299.1 |
| 4,610,803 | 9/1986 | Claussen | 252/299.1 |

FOREIGN PATENT DOCUMENTS

| | | | |
|---|---|---|---|
| 3125869 | 1/1983 | Fed. Rep. of Germany | 252/299.1 |
| 3415915 | 10/1985 | Fed. Rep. of Germany | 252/299.1 |
| 4971268 | 7/1974 | Japan | 252/299.1 |
| 61-4764 | 1/1986 | Japan | 252/299.1 |

*Primary Examiner*—Teddy S. Gron
*Attorney, Agent, or Firm*—Sprung Horn Kramer & Woods

[57] ABSTRACT

Liquid crystal material containing at least one dyestuff of the formula $$A-X-(\underset{R''}{\overset{R'}{C}})_n-O-Y, \quad \text{I}$$

in which
  A = the radical of an azo dyestuff,
  X = O or NH,
  R' and R'' = H or $C_1$–$C_4$-alkyl, it being posible for the radicals $$-\underset{R''}{\overset{R'}{C}}-$$

to be identical or different, but these radicals preferably being —$CH_2$-radicals,
  Y = optionally substituted phenyl or optionally substituted naphthyl and
  n = 2, 3 or 4, and new azo dyestuffs which come under the formula I.

6 Claims, No Drawings

AZO DYESTUFFS AND LIQUID CRYSTAL MATERIAL CONTAINING AZO DYESTUFFS

The invention relates to a liquid crystal material containing azo dyestuffs and new azo dyestuffs. The liquid crystal material is used in displays.

Displays here are understood as optoelectronic display elements which as a rule consist of two parallel plates arranged at a distance of 5 to 50 μm, at least one of which is produced from a transparent material. Electrodes are located on the inner sides of the plates, and the space between them is filled with the liquid crystal material containing a dyestuff. The structure and production of optoelectronic displays is known (Kelker, Hatz, Handbook of Liquid Crystals pp. 611 et seq.: 1980).

It is also known that selected dyestuffs which follow the changes in direction and order of the liquid crystal material effected by the externally applied field (so-called guest-host interaction) can be embedded in the liquid crystal material. This particular property makes suitable dyestuffs rare if, as well as the dichroic properties mentioned, fastness properties which enable the effect to be utilized industrially are additionally required. Important preconditions of this are fastness to light, a sufficient solubility and compatibility with other dyestuffs.

Numerous suitable individual dyestuffs are described in the literature. For example, azo dyestuffs have also frequently been mentioned (R. J. Cox: Mol. Crystals Liquid Crystals, 1979, pages 1–32).

These azo dyestuffs in general have a high degree of order. However, the tinctorial strengths are rarely sufficient and the fastness to light is frequently low. As a consequence of this knowledge, the development of usable dyestuffs has been focussed on the anthraquinone class of substances (see, for example, German Offenlegungsschrift No. 3,028,593, German Offenlegungsschrift No. 3,009,974 and German Offenlegungsschrift No. 3,006,744).

Surprisingly, it has now been found that azo dyestuffs of the formula

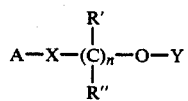

in which
A = the radical of an azo dyestuff,
X = O or NH,
Y = optionally substituted phenyl or optionally substituted naphthyl,
n = 2, 3 or 4 and
R' and R" = H or $C_1$-$C_4$-alkyl, it being possible for the radicals

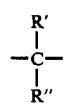

to be identical or different,
but these radicals preferably being —CH$_2$— radicals, are outstandingly suitable for use in liquid crystal material. In this material, they are fast to light, have a high tinctorial strength and have good degrees of order.

The invention accordingly relates to liquid crystal materials containing at least one dyestuff of the formula I.

Examples which may be mentioned of substituents for phenyl and naphthyl (Y) are: halogen, such as Cl, Br, F, —CN, —CF$_3$, —OCF$_3$, —R, —OR,

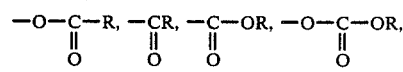

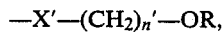

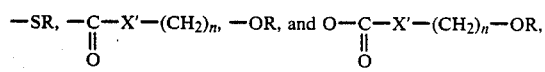

wherein
R = optionally substituted alkyl, in particular $C_1$-$C_{10}$-alkyl and $C_1$-$C_4$-alkyl, optionally substituted cycloalkyl, in particular $C_3$-$C_7$-cycloalkyl, and cyclopentyl or cyclohexyl, optionally substituted aryl, in particular phenyl or naphthyl, or optionally substituted aralkyl, in particular phenyl- or naphthyl-$C_1$-$C_4$-alkyl, for example benzyl or phenethyl,
X' = O or NH and
n' = 2, 3 or 4.

Particularly preferred substituents are: —CH$_3$, —C$_2$H$_5$, —C$_3$H$_7$, t-C$_4$H$_9$, n-C$_4$H$_9$, —C$_5$H$_{11}$, Cl, Br, cyclohexyl, phenyl, naphthyl, —OCH$_3$, OC$_2$H$_5$,

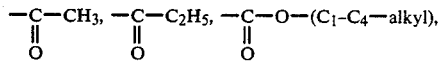

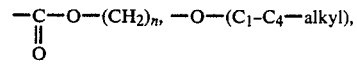

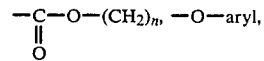

aryl designating phenyl or naphthyl, phenoxy,

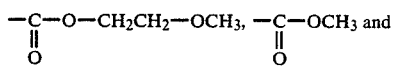

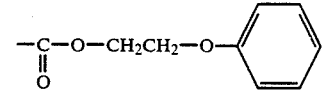

Preferably, the phenyl and naphthyl radicals Y are unsubstituted or carry one substituent.

The invention furthermore relates to new azo dyestuffs.

The liquid crystal material preferably contains at least one dyestuff of the following formulae, recurring symbols having the meanings and preferred meanings already mentioned:

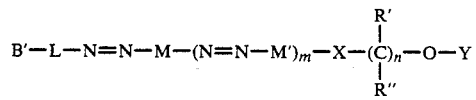      II

B'=H, —CN, —CF$_3$, —OCF$_3$, halogen, such as Cl, Br or F, —R, —OR,

—SR, —X'—(CH$_2$)$_n'$—OR,

—CN, —COOCH$_3$, —COOC$_2$H$_5$, —COOC$_2$H$_4$—OCH$_3$,

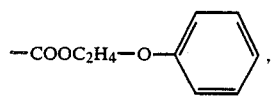

—CH$_3$, —t—C$_4$H$_9$ and —COOCH$_3$.

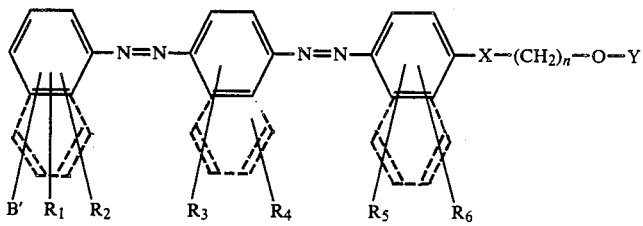

III

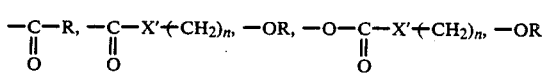

or D—N=N—;
D = the radical of a diazo component of the benzene or naphthalene series;
L and M' = optionally substituted 1,4-phenylene or optionally substituted 1,4-naphthylene;
M = optionally substituted 4,4'-biphenylylene, optionally substituted 1,4-phenylene or optionally substituted 1,4-naphthylene; and
m = 0 or 1; and, in the case where M = optionally substituted biphenylylene, m designates only 1.

Further preferred meanings for B' are:

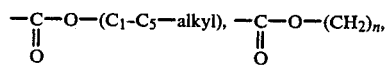

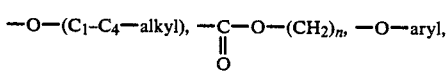

C$_1$-C$_4$-alkoxy, —O—(CH$_2$)$_n'$—O(C$_1$-C$_4$-alkyl)

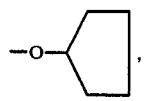

—O—(CH$_2$)$_n'$—O-aryl,

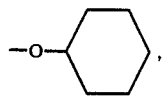

C$_1$-C$_5$-alkylthio, aryl designating phenyl or naphthyl, —OCH$_3$, —OC$_2$H$_5$, —OC$_2$H$_4$—OCH$_3$,

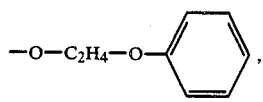

R$_1$, R$_2$, R$_3$, R$_4$, R$_5$ and R$_6$ = halogen, such as Cl, Br or F, —CN, —R, —OR, —SR,

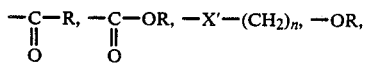

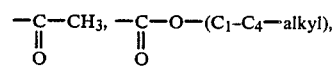

or CF$_3$.

Other preferred meanings of R$_1$, R$_2$, R$_3$, R$_4$, R$_5$ and R$_6$ are:
—CH$_3$, —C$_2$H$_5$, —OCH$_3$, —OC$_2$H$_5$,

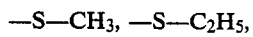

—S—CH$_3$, —S—C$_2$H$_5$,

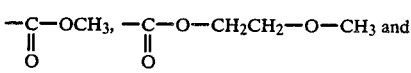

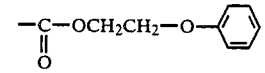

IV

B$_6$, B$_7$, B$_8$, B$_9$, B$_{10}$ and B$_{11}$ = H, —CN, —CF$_3$, Cl, Br, —CH$_3$, —C$_2$H$_5$, —OCH$_3$, —OC$_2$H$_5$,

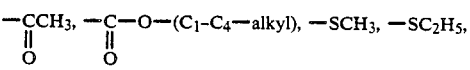

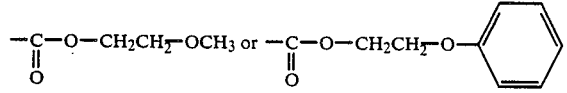

and

Y′=naphthyl or, in particular, phenyl, which can be substituted by $C_1$-$C_4$-alkyl, Cl, Br, cyclohexyl, cyclopentyl, $C_1$-$C_4$-alkoxy, phenyl, naphthyl, phenoxy,

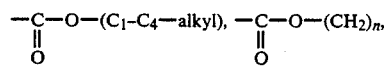

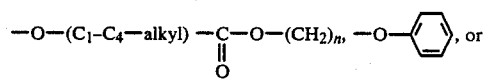, or

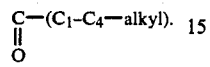

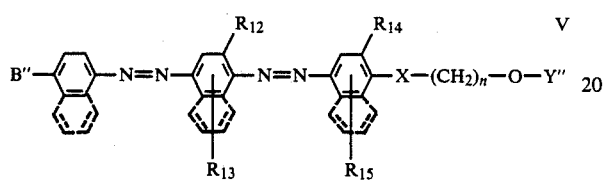

B″=B′, and, in particular, —OCH$_3$, —OC$_2$H$_5$,

—CN, —COOCH$_3$, —COOC$_2$H$_5$,

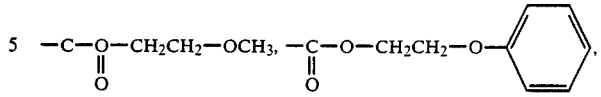,

—CH$_3$, —C$_2$H$_5$, —t—C$_4$H$_9$ or CF$_3$;

$R_{12}$, $R_{13}$, $R_{14}$ and $R_{15}$=H, —CH$_3$, —C$_2$H$_5$, Cl, Br, —OCH$_3$, —OC$_2$H$_5$,

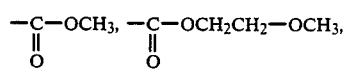

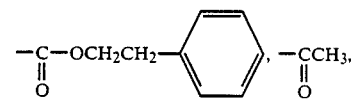

or —CN;

Y″=naphthyl or, in particular, phenyl, which can be substituted by —CH$_3$, —C$_2$H$_5$, —t—C$_4$H$_9$, Cl, Br, cyclohexyl, cyclopentyl, —OCH$_3$, —OC$_2$H$_5$, phenyl, phenoxy,

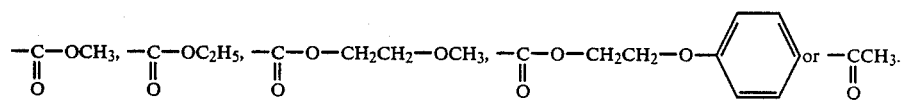

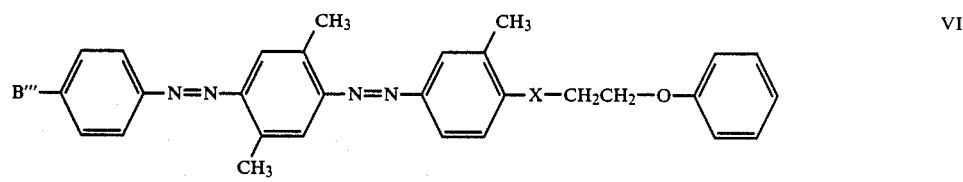

—O—CH$_2$CH$_2$—OCH$_3$,

B‴=—OCH$_3$, —OC$_2$H$_5$,

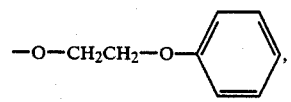,

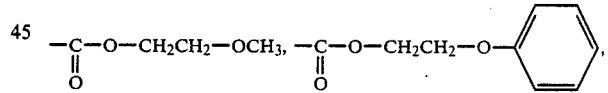,

—O—CH$_2$CH$_2$—OCH$_3$ or —CN.

—O—CH$_2$CH$_2$—OCH$_3$ or —CN.

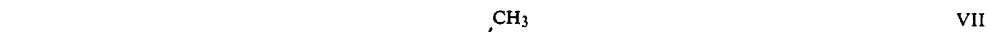

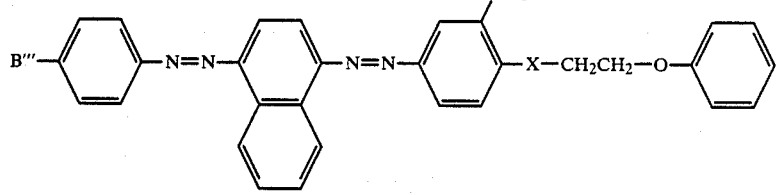

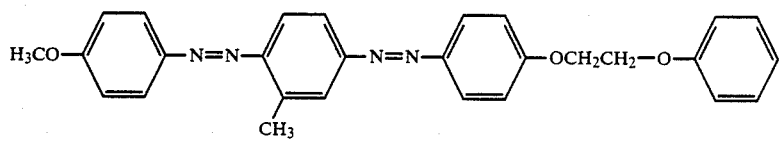

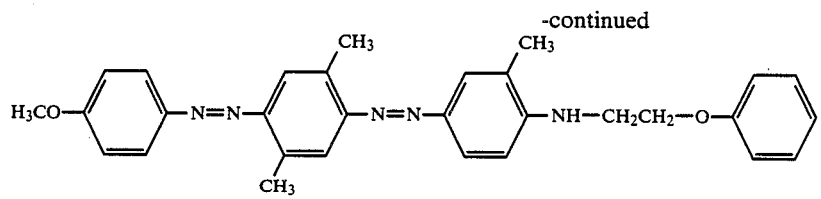
IX
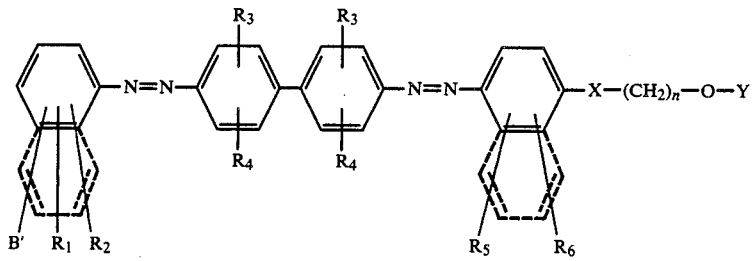
X
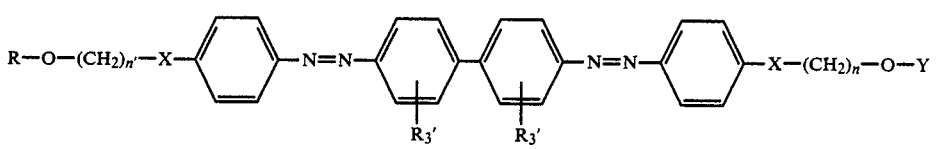
XI
$R_3'$ = halogen, such as Cl or Br, $C_1$–$C_4$-alkoxy, in particular methoxy, or $C_1$–$C_4$-alkyl, in particular methyl.
The invention furthermore relates to new dyestuffs of the formulae XII–XV
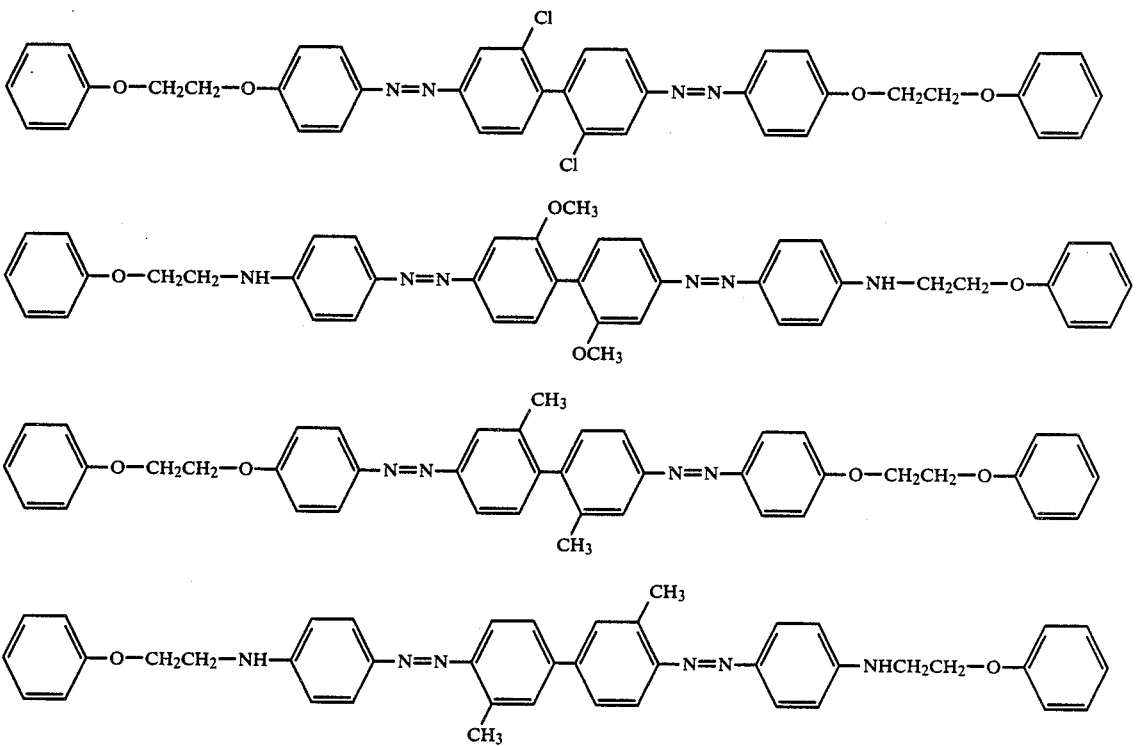
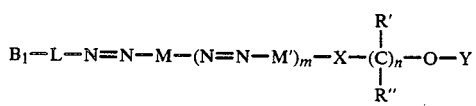
XII
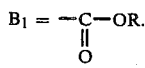

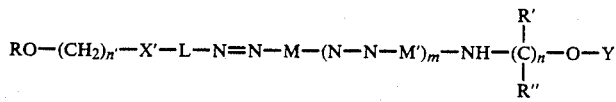

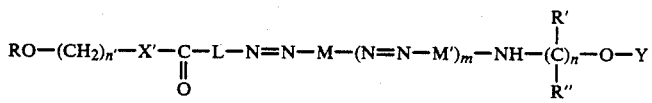

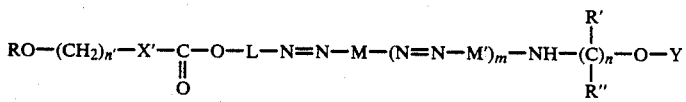

In the formulae XII–XV, B$_1$, L, R, R', R", M, M', m, X, Y, n', X' and n have the abovementioned meanings and preferred meanings.

The dyestuffs used in the liquid crystal materials and the new dyestuffs are prepared in the customary manner by diazotization and coupling, preferably by processes which are known from the literature or by processes analogous to those known from the literature (see, for example, German Offenlegungsschrift No. 2,837,500 and German Offenlegungsschrift No. 2,948,456).

If necessary, before being used in the liquid crystal material, the dyestuffs obtained in the synthesis can be purified, for example by chromatographic processes, such as partition chromatography and, in particular, column chromatography, for example over silica gel with toluene/ethyl acetate or chloroform/methanol mixtures as the mobile phase. Purity control is by thin-layer chromatography.

The dyestuffs according to the invention can be dispersed in liquid crystal materials. Use in mixtures of liquid crystal components, in particular those with positive dielectric anisotropy, is preferred. The number of mixture variants is high. Examples which may be mentioned are mixtures of 4-(4-cyanophenyl)-alkylcyclohexanes, alkyl denoting propyl (25%), n-pentyl (38%) and n-heptyl (25%) and 4-(4'-cyanobiphenyl)-n-pentyl-cyclohexane (12%) being used as an additional component, or mixtures of 4-(4'-cyanobiphenyl)-alkyl and -alkoxy compounds, for example where alkyl denotes n-pentyl (53%) and n-heptyl (25%) and alkoxy denotes octyloxy (14%), and 4-(4'-cyano-terphenyl)alkyl compounds, for example where alkyl represents n-pentyl (8%). Mixtures which contain 4-cyanophenyl-pyrimidines are likewise suitable. The liquid crystal material preferably contains about 0.01 to about 30% by weight, particularly preferably about 0.5 to about 5% by weight, of the dyestuffs according to formula I.

The dyestuffs dispersed in the liquid crystal materials and their mixtures with other dyestuffs, in particular with anthraquinone dyestuffs, can be used in optoelectronic displays.

EXAMPLE 1

13.4 g of technical-grade methyl p-amino-benzoate is diazotized with 27.8 ml of 40% strength nitrosylsulphuric acid in a mixture of 50 ml of dimethylformamide, 50 ml of acetic acid, 20 ml of propionic acid and 40 ml of 85% strength phosphoric acid at 0° C. After one hour, the mixture is poured onto 200 g of ice and the excess of nitrite is removed with amidosulphonic acid. A mixture of 10.5 g of 2,5-dimethylaniline in 100 ml of acetic acid is then added to the diazo solution. The mixture is buffered to pH 3.5 with sodium acetate solution and left overnight for the coupling to go to completion. 23.3 g of the following dyestuff are isolated.

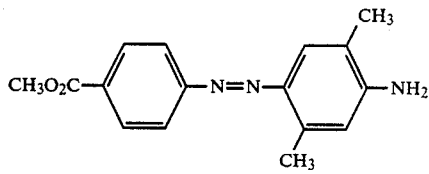

For further diazotization, 4.7 ml of 40% strength nitrosylsulphuric acid are added to a solution of 4.1 g of the above dyestuff in 50 ml of dimethylformamide, 30 ml of acetic acid and 20 ml of 85% strength phosphoric acid at room temperature. After three hours, the mixture is poured onto 100 g of ice and the excess nitrite is destroyed. A mixture of N-phenoxy-ethyl-o-methylaniline in 50 ml of dimethylformamide is then added dropwise to the resulting diazo solution. For the coupling to go to completion, the mixture is slowly buffered to pH 3 with sodium carbonate. On the following day, 7.0 g of crude dyestuff are isolated.

5.8 g of the pure dyestuff of the following formula are obtained by chromatography on silica gel with chloroform/methanol 30:1 as the mobile phase:

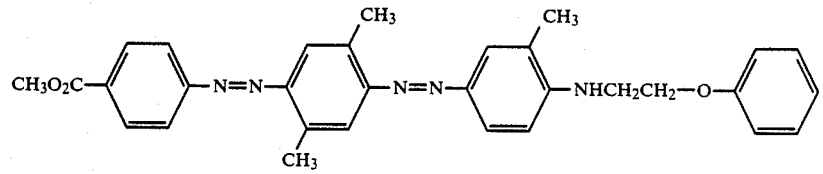

It has a degree of order S of 0.71 and an absorption maximum at 479 nm.

To determine the degree of order S, the dyestuff is dissolved in a nematic phase (TL1 1132, Merck), which is a mixture of substituted phenylcyclohexanes, and the dichroism is measured. For this, a cell, the walls of which are provided with an orientation layer and which are in plano-parallel arrangement at a distance of 20μ, is filled with the solution. The absorption is measured with polarized light, the polarization filter being adjusted so that maximum absorption takes place (A∥) at this measurement value . . . the minimum absorption is now produced by rotating the filter through 90° (A⊥). The degree of order is calculated in accordance with the known relationship $$S = \frac{\frac{A\parallel}{A\perp} - 1}{\frac{A\parallel}{A\perp} + 2}$$

EXAMPLE 2

3.56 g of p-methoxyaniline are dissolved in 25 ml of warm hydrochloric acid. After addition of 50 g of ice, the amine is diazotized with 2.1 g of sodium nitrite in 10 ml of water at 0° C. The mixture is subsequently stirred for one hour and the excess nitrite is removed. A mixture of 3.1 g of m-toluidine and 10 ml of acetic acid is then added dropwise to the diazo solution. The mixture is slowly buffered to pH 4 with sodium acetate solution and 6.1 g of crude dyestuff of the following formula

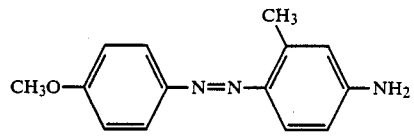

are isolated the next day.

3.49 g of the above dyestuff are diazotized with 4.7 ml of 40% strength nitrosylsulphuric acid in a mixture of 50 ml of dimethylformamide, 30 ml of acetic acid and 20 ml of 85% strength phosphoric acid at room temperature. After three hours, the mixture is poured onto ice and the excess nitrite is removed with amidosulphonic acid. A solution of 1.4 g of phenol in 10 ml of dimethylformamide is then added to the mixture. To bring the coupling to completion, the suspension is then poured onto a mixture of 200 g of ice and 150 ml of sodium hydroxide solution. After acidification to pH 5, 4.5 g of the crude dyestuff of the following formula are isolated by filtration with suction the next day.

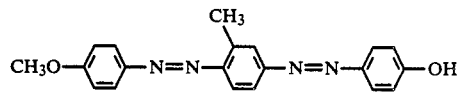

3.46 g of the above disazo dyestuff are heated under reflux in 50 ml of butan-2-one together with 2.2 g of β-bromo-phenoxy-ethane and 2.5 g of potassium carbonate. The end of the etherification is indicated by thin-layer chromatography. The crude dyestuff is isolated by pouring the mixture onto water and filtering with suction. After chromatography on silica gel with chloroform/2% strength methanol as the mobile phase, 4.1 g of the pure dyestuff of the following formula are obtained.

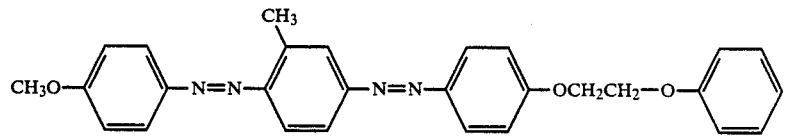

It has a degree of order S of 0.71 and an absorption maximum at 400 nm.

The following dyestuffs can also be prepared by the principle demonstrated in Examples 1 and 2:

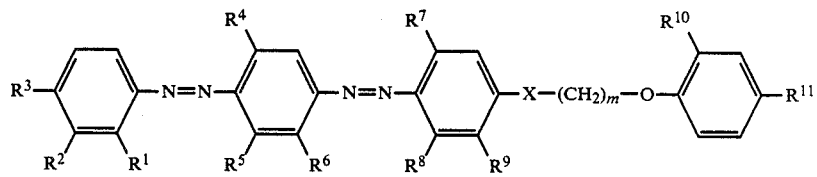

| Exmp. | R¹ | R² | R³ | R⁴ | R⁵ | R⁶ | R⁷ | R⁸ | R⁹ | R¹⁰ | R¹¹ | X | n | S | λmax |
|---|---|---|---|---|---|---|---|---|---|---|---|---|---|---|---|
| 3 | H | H | Cl | H | H | H | CH₃ | H | H | H | H | O | 2 | | |
| 4 | CH₃ | ⟨—CH=CH—⟩ | H | H | H | H | H | H | H | H | CH₃ | O | 2 | | |
| 5 | CH₃ | H | OCH₃ | H | H | H | H | H | CH₃ | H | H | NH | 2 | | |
| 6 | H | H | OCH₃ | H | ⟨—CH=CH—⟩ | | H | H | CH₃ | H | H | O | 2 | | 460 |
| 7 | H | H | OCH₃ | CH₃ | H | CH₃ | H | H | H | H | H | O | 2 | | 444 |
| 8 | H | H | OCH₃ | CH₃ | ⟨—CH=CH—⟩ | | CH₃ | H | H | H | H | O | 2 | 0.75 | 402 |
| 9 | H | H | OCH₃ | H | H | CH₃ | H | CH₃ | H | H | H | O | 2 | | 450 |
| 10 | H | H | OCH₃ | H | ⟨—CH=CH—⟩ | | H | H | CH₃ | H | H | O | 2 | | 506 |
| 11 | H | H | OCH₃ | H | ⟨—CH=CH—⟩ | | H | H | H | H | H | NH | 2 | | 506 |
| 12 | H | H | OCH₃ | CH₃ | H | CH₃ | H | H | CH₃ | H | H | NH | 2 | 0.70 | 456 |
| 13 | H | H | OCH₃ | CH₃ | H | CH₃ | CH₃ | H | CH₃ | H | H | NH | 2 | 0.70 | 465 |
| 14 | H | H | OCH₃ | CH₃ | H | CH₃ | H | H | H | H | H | NH | 2 | 0.70 | 451 |
| 15 | H | H | CO₂CH₃ | H | ⟨—CH=CH—⟩ | | H | H | CH₃ | H | H | NH | 2 | 0.72 | 517 |
| 16 | H | H | OCH₃ | CH₃ | H | CH₃ | H | H | CH₃ | H | H | NH | 2 | 0.71 | 457 |
| 17 | H | H | OCH₃ | CH₃ | H | CH₃ | H | H | CH₃ | H | H | NH | 2 | | |
| 18 | H | H | OCH₃ | CH₃ | H | CH₃ | H | H | H | H | H | O | 2 | | |
| 19 | H | H | OC₂H₄—OCH₃ | CH₃ | H | ⟨—CH=CH—CH=⟩ | | | H | CH₃ | CH₃ | O | 3 | | |
| 20 | CH₃ | H | OCH₃ | OCH₃ | H | H | Cl | H | H | H | C₂H₅ | O | 4 | | |
| 21 | H | H | Cl | H | H | H | H | H | H | Cl | n-C₄H₉ | O | 2 | | |
| | | | CO₂C₂H₄O—C₆H₅ | | | | | | | | | | | | |
| 22 | H | H | CN | H | H | CN | H | H | H | H | H | O | 2 | | |
| 23 | H | H | O—n-C₄H₉ | CH₃ | CH₃ | H | H | H | OCH₃ | H | OCH₃ | NH | 4 | | |
| 24 | H | Cl | Cl | Cl | H | H | Cl | H | H | H | CO₂CH₃ | O | 2 | | |

-continued

| Exmp. | R¹ | R² | R³ | R⁴ | R⁵ | R⁶ | R⁷ | R⁸ | R⁹ | R¹⁰ | R¹¹ | X | n | S | λmax |
|---|---|---|---|---|---|---|---|---|---|---|---|---|---|---|---|
| 25 | H | H | $CF_3$ | $CF_3$ | H | H | $CH_3$ | H | $CH_3$ | H | $CO_2C_4H_8O$-Ph | O | 2 | | |
| 26 | H | H |  | $COCH_3$ | H | H | $CH_3$ | H | $CH_3$ | Cl | O—n-$C_4H_9$ | O | 2 | | |
| 27 | H | H |  | H | H | $CO_2CH_3$ | H | H | =CH—CH= | H | —CO—$C_4H_9$ | NH | 3 | | |
| 28 | H | H | $CH_3O$-Ph-N=N | H | $CH_3$ | H | H | H | H | H | H | O | 2 | | |
| 29 | =CH—CH= | H | H | $OCH_3$ | H | $CF_3$ | H | H | CN | H | H | NH | 2 | | |
| 30 | H | H | $CH_3S$ | Br | H | $OCH_3$ | H | $OCH_3$ | H | Br | $OC_2H_5$ | NH | 3 | | |
| 31 | H | H | $CO_2C_2H_4$—O— | H | H | H | $OCH_3$ | H | $OCH_3$ | H |  | NH | 2 | | |
| 32 | $CH_3$ | H | $CH_3$ | H | H | $COCH_3$ | H | H | =CH—CH= | H | CN | O | 4 | | |
| 33 | H | H | $OCOOCH_3$ | H | H | $CH_3$ | $CH_3$ | H | $CH_3$ | H | Br | O | 2 | | |
| 34 | H | H | $OCOCH_3$ | H | H | H | H | H | $CH_3$ | H | $OCOOC_2H_5$ | O | 2 | | |

We claim:

1. A liquid crystal composition comprising a liquid crystal material and at least one dyestuff of the formula

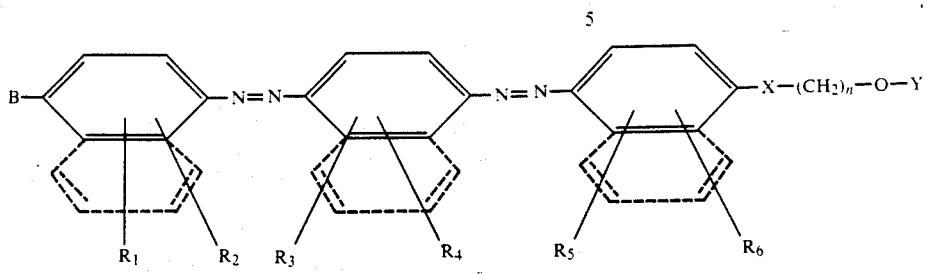

in which
X = O or NH,
Y = optionally substituted phenyl or optionally substituted naphthyl,
n = 2, 3 or 4 and
B' = H, —CN, —CF$_3$, —OCF$_3$, halogen, —R, —OR,

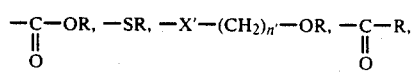, —SR, —X'—(CH$_2$)$_{n'}$—OR, 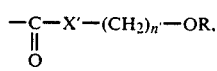,

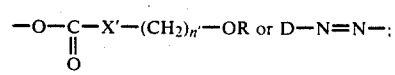

—O—C(=O)—X'—(CH$_2$)$_{n'}$—OR or D—N=N—;

wherein
R = optionally substituted alkyl, optionally substituted cycloalkyl, optionally substituted aryl, or optionally substituted aralkyl
X' = O or NH and
n' = 2, 3 or 4;
D = the radical of a diazo component of the benzene or naphthalene series;
R$_1$, R$_2$, R$_3$, R$_4$, R$_5$ and R$_6$ = H, halogen, —CN, —R', —OR', —SR', —C(=O)—R', —C(=O)—OR', —X'—(CH$_2$)$_{n'}$—OR', —C(=O)—X'—(CH$_2$)$_{n'}$—OR or CF$_3$, and R' = C$_1$-C$_4$-alkyl and R'' = C$_1$-C$_4$-alkyl or phenyl.

2. A liquid crystal composition according to claim 1, containing at least one dyestuff of the formula

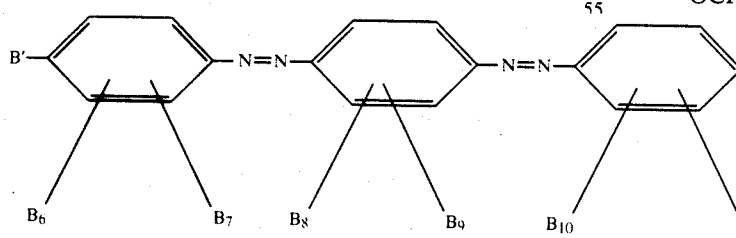

in which
B$_6$, B$_7$, B$_8$, B$_9$, B$_{10}$ and B$_{11}$ = H, —CN, —CF$_3$, Cl, Br, —CH$_3$, —C$_2$H$_5$, —OCH$_3$, —OC$_2$H$_5$, —C(=O)CH$_3$, —C(=O)—O—(C$_1$-C$_4$—alkyl), —SCH$_3$, —SC$_2$H$_5$,

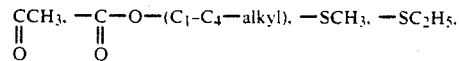

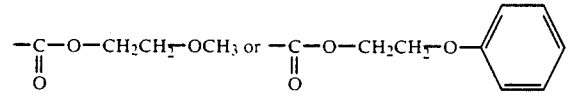

and
Y' = naphthyl or phenyl, which can be substituted by C$_1$-C$_4$-alkyl, Cl, Br, cyclohexyl, cyclopentyl, C$_1$-C$_4$-alkoxy, phenyl, naphthyl, phenoxy,

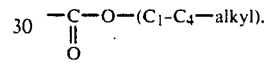

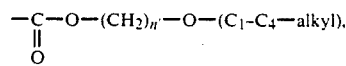

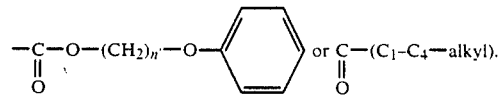

3. A liquid crystal composition according to claim 1, containing at least one dyestuff of the formula

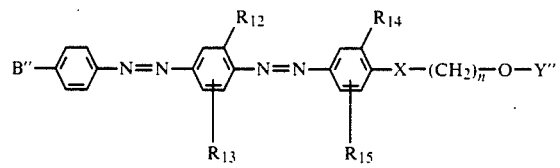

in which
B'' = B',
R$_{12}$, R$_{13}$, R$_{14}$ and R$_{15}$ = H, —CH$_3$, —C$_2$H$_5$, Cl, Br, —OCH$_3$, —OC$_2$H$_5$,

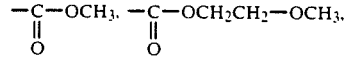

-continued

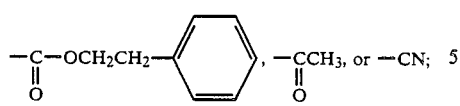

Y″=naphthyl or, phenyl, which can be substituted by —CH₃, —C₂H₅, —t—C₄H₉, Cl, Br, cyclohexyl, cyclopentyl, —OCH₃, —C—OC₂H₅, phenyl, phenoxy,

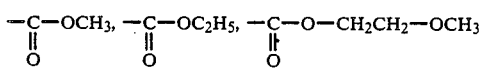

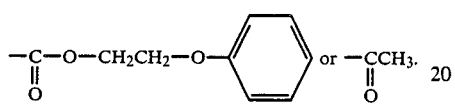

4. A liquid crystal composition according to claim 1, containing about 0.01 to about 30% by weight of dyestuff or dyestuff mixture.

5. A liquid crystal material according to claim 3 in which
B″=—OCH₃, —OC₂H₅, —O—CH₂CH₂—OCH₃,

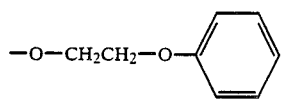

—CN, —COOCH₃, —COOC₂H₅,

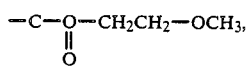

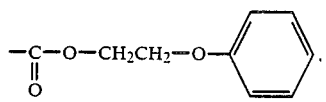

—CH₃, —C₂H₅, —t—C₄H₉, or CF₃.

6. A liquid crystal material according to claim 1 containing about 0.5 to about 5% by weight of dyestuff or dyestuff mixture.

* * * * *

UNITED STATES PATENT AND TRADEMARK OFFICE
CERTIFICATE OF CORRECTION

PATENT NO. : 4,770,809

DATED : September 13, 1988

INVENTOR(S) : Holger Heidenreich, et al

It is certified that error appears in the above-identified patent and that said Letters Patent is hereby corrected as shown below:

| | |
|---|---|
| Col. 5, line 51 | Delete "-O-$CH_2$-$CH_2$-$OCH_3$ or -CN." |
| Col. 17, line 4 | Beginning of formula delete "B-" and substitute --B'-- |
| Col. 17, line 50 | Delete "OR" and substitute --OR''-- |
| Col. 17, line 56 | Delete formula and substitute |

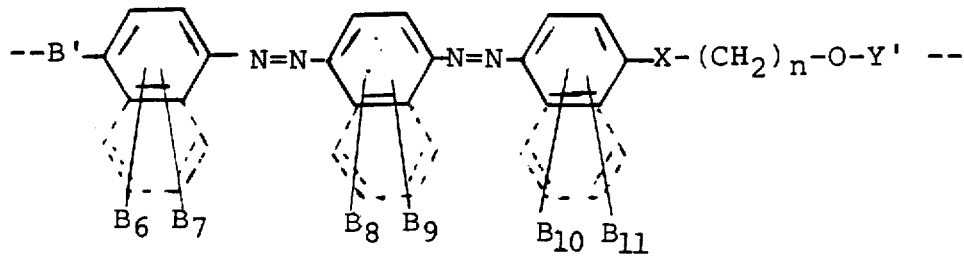

Col. 18, line 46    Delete formula and substitute

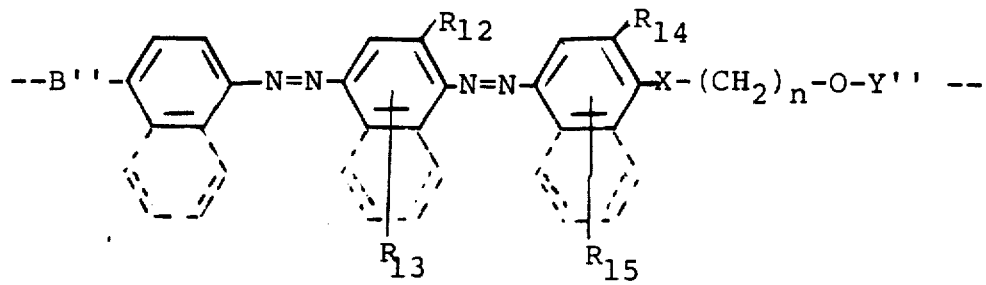

UNITED STATES PATENT AND TRADEMARK OFFICE
CERTIFICATE OF CORRECTION

PATENT NO. : 4,770,809

DATED : September 13, 1988

INVENTOR(S) : Holger Heidenreich, et al

It is certified that error appears in the above-identified patent and that said Letters Patent is hereby corrected as shown below:

Col. 20, line 6    After "  " insert --,--

Signed and Sealed this

Twenty-third Day of May, 1989

Attest:

DONALD J. QUIGG

Attesting Officer     Commissioner of Patents and Trademarks